United States Patent [19]

Buck

[11] 3,926,054
[45] Dec. 16, 1975

[54] GRAVITY GRADIOMETER
[75] Inventor: Sheldon W. Buck, Brookline, Mass.
[73] Assignee: The Charles Stark Draper Laboratory, Inc., Cambridge, Mass.
[22] Filed: Nov. 11, 1974
[21] Appl. No.: 522,635

[52] U.S. Cl. ................................................ 73/382
[51] Int. Cl.² ........................................ G01V 7/00
[58] Field of Search ..................................... 73/382

[56] References Cited
UNITED STATES PATENTS
3,073,165  1/1963  Slater et al. ........................ 73/382
3,180,151  4/1965  Gustafsson .......................... 73/382

Primary Examiner—James J. Gill
Attorney, Agent, or Firm—Kenway & Jenney

[57] ABSTRACT

An apparatus for continuously measuring the gravity gradient. Two dynamically balanced pendulums (DBP's) are configured with their respective sensitive axes being parallel to a common gradiometer sensitive axis. The DBP's each include a pendulous sensor, with the sensors being separated by a predetermined distance along the gradiometer sensitive axis. A coupling means rotationally couples the sensors about their sensitive axes. According to one embodiment, the first DBP (DBP-1) is configured as an accelerometer having associated servo electronics and a torque motor. DBP-1 nulls the angular displacement of the DBP-1 sensor input axis from its sensitive axis (induced by the gravitational field at the DBP-1 sensor axis) by rotating the coupled sensors about their respective sensitive axes at an angular rate proportional to the gravitational acceleration sensed by the DBP-1 sensor. The second DBP (DBP-2) is arranged in a torque-to-balance loop configuration having associated servo electronics and a torquer. DBP-2 nulls the angular displacement of the DBP-2 sensor input axis from its sensitive axis (induced by both the gravitational field at the DBP-2 sensor and rotation of the coupled sensors) by generating a torque-to-null signal, to which the torquer is responsive to balance DPB-2. The torque-to-null for this loop is proportional to the difference in gravitational forces sensed by the DBP-1 and DBP-2 sensors. When the sensitive axis is vertically aligned, the torque-to-null is directly proportional to the vertical gravity gradient along the length of the coupling shaft.

23 Claims, 10 Drawing Figures

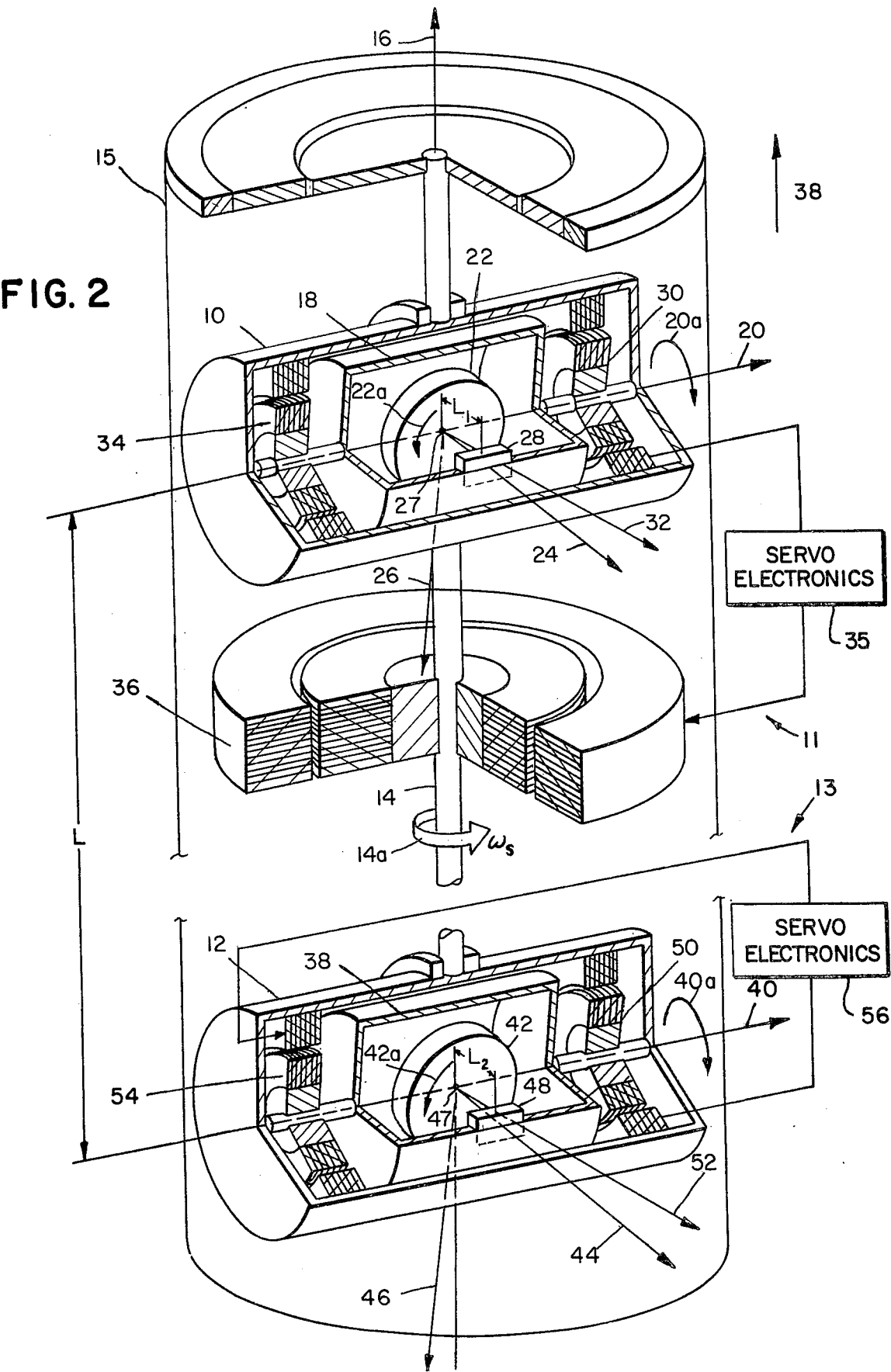

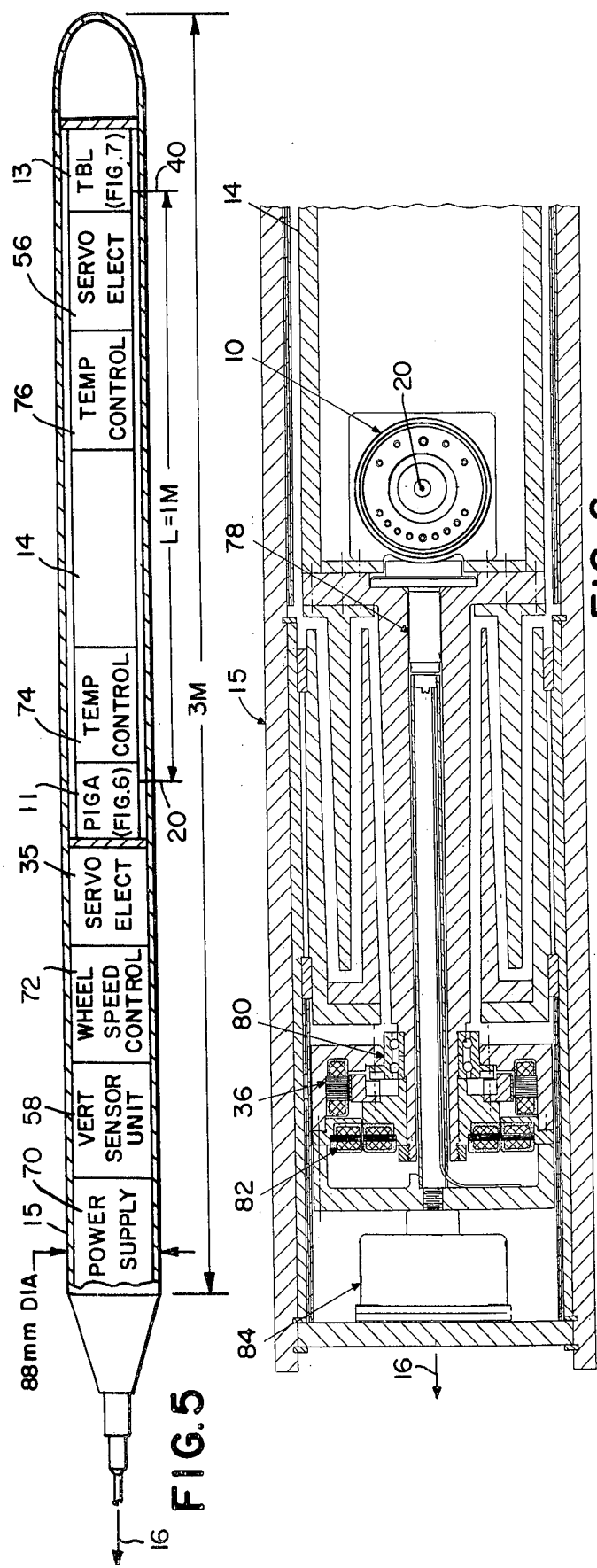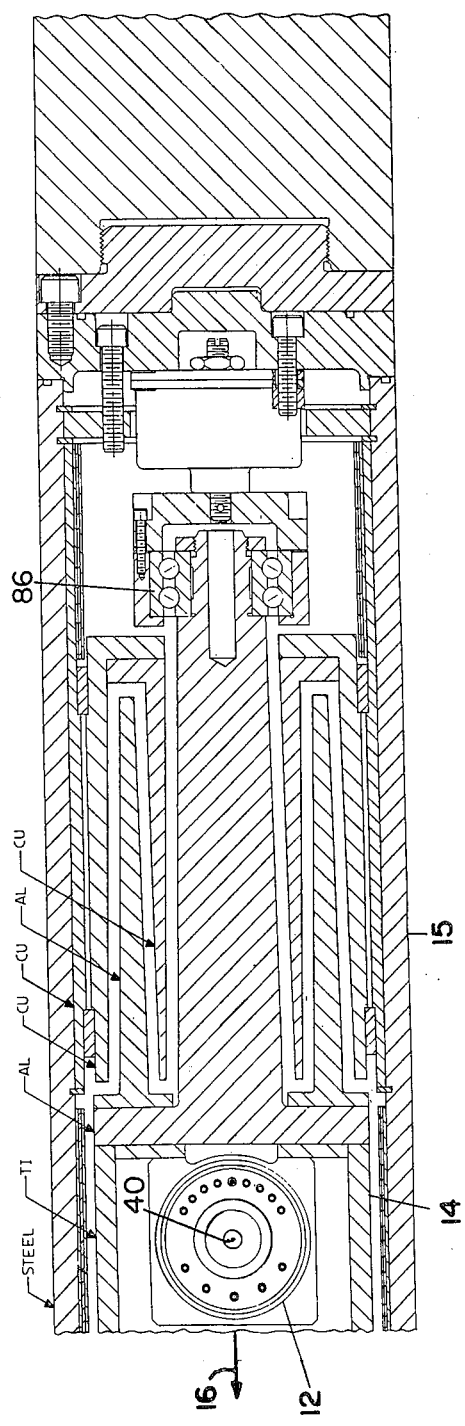

GRAVITY GRADIOMETER

BACKGROUND OF THE INVENTION

This invention relates to gravitational field measurements and more particularly, to an apparatus for continuously measuring the vertical gravity gradient.

Gravitational field measurement instrumentation has been developed in recent years in association with inertial guidance systems and geophysical exploration. For example, precision accelerometers have been adapted for use as gravimeters as set forth in U.S. Pat. No. 3,073,165 to Slater, et al. in which a pendulous element is maintained in a dynamically balanced state by offsetting the gravitational acceleration with a gyro torque. Suitable accelerometers for this gravimeter include a Pendulous Integrating Gyro Accelerometer (PIGA) as described in Macomber & Fernandez, *Inertial Guidance Engineering*, Prentice Hall, 1962. As there described, the PIGA comprises a single degree of freedom (SDF) gyro which is configured with a gyro wheel, with the wheel being pendulous relative to the output axis. An alternative accelerometer adapted for gravitational field intensity detection is the configuration disclosed in U.S. Pat. No. 3,190,121, to Blasingame, which also maintains a pendulous element in a dynamically balanced state by offsetting the gravitational acceleration with centrifugal acceleration. Both of these dynamically balanced pendulum gravimeters are capable of providing extremely high resolution gravitational field intensity measurements at their respective sensor location.

It is well known that an instrument for continuously measuring the vertical gravity gradient with a resolution of 10 Eotvos units in an oil well environment would permit exploration geophysicists and petrology engineers to differentiate oil and water bearing strata in the vicinity of a borehole. See, for example, L. A. Beyer, "The Vertical Gradient of Gravity in Vertical and Near-Vertical Boreholes," U.S. Department of the Interior Geological Survey, Open-File Report, Released June 24, 1971, Doctoral Dissertation for the Department of Geophysics, Stanford University, Palo Alto, California.

The principle prior art method for determining the vertical gravity gradient for well-logging purposes requires a detailed gravity survey using gravitational field intensity measurements produced every two meters by a borehole gravimeter, followed by the appropriate calculation to generate the gradient. This method of determining the gravity gradient is extremely time consuming and is inherently incompatible with continuous well-logging practice.

Other techniques for generating the gravity gradient have been developed for airborne geophysical use and for space flight. Such techniques known in the art may utilize Rotating Elastic Systems, Vibrating String Devices, Fluid Inertial Dipoles, to name but a few. These and other devices are fully described in "Gravity Gradient Instrument Study," Manned Space Science Programs, Office of Space Science and Applications, N.A.S.A., a final report by Arma Division American Bosch Arma Corporation, Garden City, New York, on Contract NAS W-1328, Washington, D.C., August 1966. However, none of these known techniques are suitable for an instrument capable of continuously measuring the vertical gravity gradient in a borehole environment due primarily to the extreme sensitivity to vibration and acceleration of the associated instruments. Furthermore, the speed of response and common mode rejection of the Earth's gravitational field in such systems is severely limited due to inherently small dynamic range and insufficient linearity of the sensor.

SUMMARY OF THE INVENTION

It is an object of the present invention to continuously provide a measure of the vertical gravity gradient.

It is a further object of this invention to provide a continuous reading gravity gradiometer for use in a borehole environment.

Two dynamically balanced pendulums (DBP's, or alternatively, rotate-to-null specific force detectors), each including a pendulous sensor, are configured with their respective sensitive axes being parallel to a common gradiometer sensitive axis and with the sensors being separated by a predetermined distance along the gradiometer sensitive axis. A coupling means rotationally couples the sensors about their sensitive axes. According to the one embodiment of the present invention, the two sensors are pendulous integrating gyros (PIG's). These sensors are connected by a coupling shaft of predetermined length with the longitudinal axis of the coupling shaft corresponding to the sensitive axis of the gradiometer. The gradiometer sensitive axis passes through the intersection points of the input and output axes of both PIG's. The two PIG's are further constrained to have substantially identical pendulosity-to-wheel-angular momentum ratios.

The first DBP (DBP-1) is arranged in an accelerometer configuration (PIGA) including its PIG, associated servo electronics (including a signal generator) and a torque motor for rotating the coupling shaft and the coupled PIG's about the sensitive axis. The first PIG and associated servo electronics and torque motors are configured to null the gravitational acceleration-induced angular displacement of the first PIG input axis relative to the sensitive axis by rotating the coupled PIG's about the sensitive axis. The resultant precession rate of the shaft and coupled PIG's about the sensitive axis at null is proportional to the gravitational force sensed at the first PIG.

The second DBP (DBP-2) is arranged in a torque-to-balance loop configuration including its PIG, associated servo electronics (including a signal generator) and PIG torquer for supplying torque about the second PIG output axis. The second PIG and associated servo electronics and torquer are configured to null the angular displacement of the second PIG input axis from the sensitive axis by torquing the second PIG about its output axis. Since the second PIG is constrained by the coupling shaft to precess about the gradiometer sensitive axis at the same rate as the first PIG, the torque-to-null signal generated by the second PIG servo electronics is proportional to the difference in the gravitational force sensed at the first and the second PIG's. Where the sensitive axis is aligned with the vertical axis, this signal is directly proportional to the vertical gravity gradient along the length of the coupling shaft. In this configuration, the vertical gravity gradient may be continuously measured with a high speed of response and substantial common mode rejection of the Earth's gravitational field due to the inherently large dynamic range and linearity of the gyro sensors. Because measurements are made with respect to inertial space, rotational stability of the outer case is not required.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 2 shows the gradiometer of FIG. 1 in cutaway schematic form;

FIGS. 5–7 show a practical embodiment of the gradiometer of FIGS. 1–3; and

DESCRIPTION OF THE PREFERRED EMBODIMENT

Figure 1:
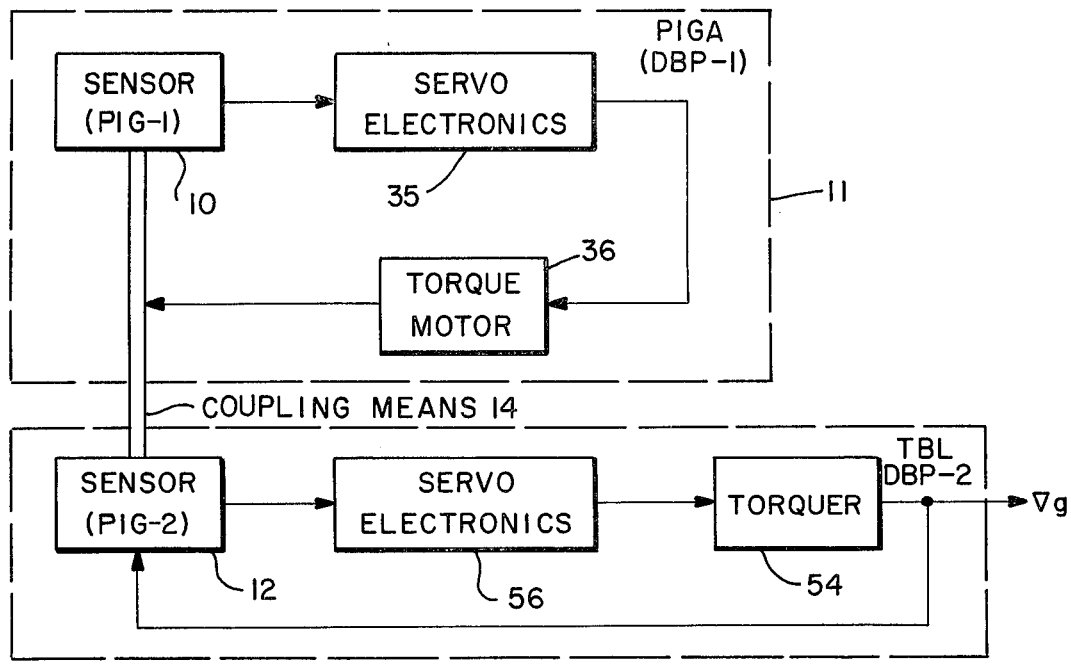
FIG. 1 shows, in block diagram form, a gravity gradiometer in accordance with the present invention.

A gravity gradiometer in accordance with the present invention is shown in block diagram form in FIG. 1 and in cutaway schematic form in FIG. 2. In those figures, two single degree of freedom, pendulous integrating gyro sensors PIG-1 and PIG-2 (hereinafter denoted PIG's 10 and 12), are shown within gradiometer casing 15 as elements of dynamically balanced pendulums 11 (DBP-1) and 13 (DBP-2), respectively. PIG's 10 and 12 are mechanically coupled by a shaft 14 so that their respective PIG sensitive axes and coupling shaft 14 are coaxial with the sensitive axis 16 of the gradiometer. Alternatively, the PIG's 10 and 12 may have their respective sensitive axes parallel to but not necessarily coaxial with gradiometer sensitive axis 16. In other embodiments, PIG's 10 and 12 may be coupled to precess together about the gradiometer sensitive axis 16 in a different manner in keeping with the present invention. For example, the PIG's may be coupled by a synchrorepeater having a motor and angle encoder associated with each PIG and appropriate electrical coupling circuitry.

In the embodiment of FIGS. 1 and 2, a gyro float 18 is disposed within the outer shell of PIG 10 and arranged in a manner permitting rotation about a PIG output axis 20 which lies in a plane perpendicular to the sensitive axis 16. Within float 18 is a gyro wheel 22 which is electrically driven to rotate at an angular rate $\Omega_1$ (in the indicated direction 22a) about a spin axis 24 lying in a plane perpendicular to the output axis 20. The input axis 26 for PIG 10 is perpendicular to both output axis 20 and spin axis 24. It will be understood that axes 16, 20, 24 and 26 have a common intersection point 27 located substantially at the center of gravity of the wheel 22.

An unbalance mass $(m_1)$ 28 is located on the outer shell of float 18 at a distance $L_1$ from the intersection point 27 along axis 24. In other embodiments, the unbalance mass 28 may be otherwise distributed over the float 18 but still be characterized by a magnitude $m_1$ and a distance $L_1$ of the effective center of mass from the axes intersection point 27. It will be understood that effects of minor displacements in the location of mass $m_1$ from axis 24 will offset by determining the gravity gradient at time periods corresponding to integral numbers of revolutions of PIG 10. In this manner, the error components are averaged over the 360° revolution.

Within the casing of PIG 10 is a signal generator 30 which provides a control signal proportional to the angular displacement of the input axis 26 from the DBP-1 sensitive axis (coaxial with axis 16). Alternatively, this angular displacement of axis 26 from axis 16 may be expressed as the angular displacement of the spin axis 24 from a plane defined by reference axis 32 (perpendicular to axis 16) and output axis 20.

At the other end of PIG 10 is a torquer 34 which may apply a torque about the output axis 20 to float 18 in response to an applied electrical signal. In the embodiment shown in FIGS. 1 and 2, the torquer 34 is operative to null internal torque biases and also to establish a symmetrical distribution of mass about the plane defined by axes 16 and 24.

In DBP-1, PIG 10 is arranged in an accelerometer configuration (hereafter denoted PIGA 11) which includes servo electronics 35 and a torque motor 3 for rotating shaft 14 relative to casing 15. It will be understood that in other embodiments, the servo electronics 35 may include signal generator 30. Signal generator 30 provides an input signal to servo electronics 35, which has its output in turn applied to a torque motor 36.

Operation of the PIGA 11 will now be briefly described. In response to a rectilinear acceleration applied to PIGA 11 in the direction denoted by reference arrow 38, float 18 (and wheel 22) are torqued about axis 20 so that the input axis 26 tends to become angularly displaced from the sensitive axis 16 (as indicated in FIG. 2). The signal generator 30 provides a signal to electronics 35 which is proportional to the angular displacement of float 18 (and wheel 22) about axis 20. Servo electronics 35 then applies a signal to the torque motor 36 which in turn rotates shaft 14 at an angular rate $\omega_s$ about axis 16 (indicated by the arrow 14a) and consequently, the PIG 10 is rotated at that angular rate. This rotation couples with the angular momentum of the wheel 22 to cause a gyroscopic torque about the output axis 20. Null conditions are maintained when the gyroscopic torque and the unbalance torque from gravity or acceleration are equal. The angular rate $\omega_s$ then becomes proportional to sensed acceleration.

The PIG's 10 and 12 are separated by a predetermined distance denoted L in FIG. 2 and coupled by shaft 14 so that rotation of shaft 14 is effective to rotate both PIG's 10 and 12 at an identical angular rate. It will be understood that PIG 12 is substantially identical to the upper PIG 10 and includes float 38 arranged to rotate about PIG 12 output axis 40, wheel 42 which is electrically driven to rotate at an angular velocity $\Omega_2$, wheel 42 being arranged to rotate in the indicated direction 42a about spin axis 44, input axis 46 perpendicular to both axes 40 and 44 and having a common point of intersection 47 with those axes and axis 16, unbalance weight 48 characterized by mass $m_2$ and center of gravity location at a distance $L_2$ from the intersection point 47. It will be understood that PIG's 10 and 12 may differ somewhat as long as the ratio $$\frac{m_1 L_1}{I_1 \Omega_1}$$

remains substantially equal to the ratio $$\frac{m_2 L_2}{I_2 \Omega_2},$$

where $I_1$ and $I_2$ are the moments of inertia of wheels 22 and 42, respectively.

In addition to PIG 12, the second dynamically balanced pendulum, DBP-2, futher includes signal generator 50, servo electronics 56 and torquer 54. Signal generator 50 produces an output signal proportional to the angular displacement of input axis 46 with respect to the PIG 12 sensitive axis (coaxial with axis 16, in this embodiment). Torquer 54 is arranged to apply a torque tending to rotate float 38 together with wheel 42 about output axis 40 in response to an applied electrical signal.

As so configured, DBP-2 is arranged in a torque-to-balance loop (hereafter denoted TBL 13), including PIG 12 together with signal generator 50, servo electronics 56 and torquer 54. The output of signal generator 50 is applied to servo electronics 56 whose output in turn is applied to the input of torquer 54. In other embodiments, signal generator 50 may be included in servo electronics 56.

Briefly, in operation, as discussed above, the entire assembly of PIG 12 rotates about axis 16 at an angular rate proportional to the acceleration sensed by PIGA 11. Furthermore, the gravitational acceleration in the direction 38 applied at TBL 13 applies a further input to PIG 12. Both this external acceleration input and the angular velocity input imparted by shaft 14 tend to displace the input axis 46 with respect to the sensitive axis 16. Signal generator 50 produces an output signal indicative of the net angular displacement of axis 46 with respect to axis 16 (i.e. proportional to the net angular displacement of float 38 about axis 40). The output signal of servo electronics 56 is applied to the torquer 54 which generates a resultant torque tending to null that angular displacement of axis 46. The signal applied by electronics 56 to torquer 54 provides a measure of the difference in gravitational acceleration applied to PIG's 10 and 12.

In the operation of both PIGA 11 and TBL 13, the gravitational forces sensed by the PIGA 11 result in a precessional motion of both PIG's 10 and 12 (as coupled by shaft 14) about the axis 16. The resultant torque-to-null response of TBL 13 has the effect of subtracting the value of the gravitational force sensed by the PIG 10 from that of the PIG 12. Consequently, the torque-to-null signal generated by servo electronics 56 is a measure of the difference in gravitational acceleration sensed by PIG's 10 and 12. Accordingly, this signal is directly proportional to the gravity gradient $\nabla g$ along the length L of axis 16 between axes 20 and 40.

For cases where the sensitive axis 16 is vertical, the torque-to-null drive signal for torquer 54 is proportional to the vertical gravity gradient. However, where axis 16 is offset from the vertical by an angle $\theta$, the torquer 54 drive signal is further proportional to the square of the cosine of the angle formed between axis 16 and the vertical, as described more fully below.

Figure 3:
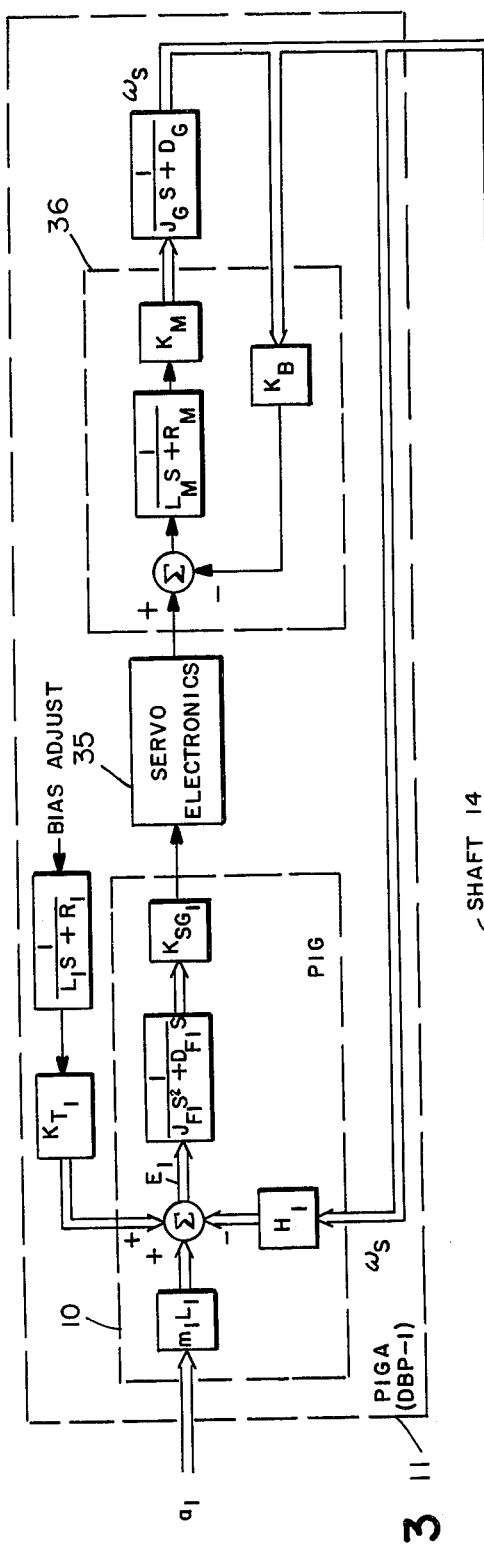
FIG. 3 shows the gradiometer of FIG. 1 in detailed block diagram form.

FIG. 3 shows a detailed block diagram of the elements and associated transfer functions and input and output signals for the gradiometer of FIGS. 1 and 2. In FIG. 3, the double line arrows indicate mechanical coupling and the single line arrows electrical coupling.

PIG 10 is characterized by a pendulosity $P_1$ ($=m_1 L_1$), angular momentum $H_1$ ($=I_1 \Omega_1$) of wheel 22. The float transfer function is denoted by $$\frac{1}{J_{F1} s^2 + D_{F1} s}$$

where $J_{F1}$ is the moment of inertia of float 18 about axis 20 and s represents the Laplace operator and $D_{F1}$ is the coefficient damping of the float about axis 20. The signal generator 30 gain is $K_{SG1}$. The torquer 34 is connected in a manner permitting a bias adjustment and is characterized by a winding transfer function $$\frac{1}{L_1 s + R_1}$$

and torquer constant $K_{T1}$. The summing network in PIG 10 depicts the combination of inputs applied thereto, i.e., the gravitational acceleration $a_1$ (as modified by the pendulosity) and the precessional velocity $\omega_s$ (as modified by the angular momentum).

The torque motor 36 is characterized by the motor winding transfer function $$\frac{K_M}{L_M s + R_M},$$

where $L_M$ is the torque motor winding inductance, $R_M$ is the torque motor winding resistance, and $K_M$ is the torque motor constant. The torque motor is further characterized by the back emf constant, $K_B$. The response of the shaft 14 to the applied torque generated by motor 36 is indicated by the gyro transfer function $$\frac{1}{J_G s + D_G}$$

where $J_G$ is the moment of inertia of PIG 10 about the input axis 26 and $D_G$ is the coeffecient of damping about the input axis 26.

In a similar manner, the TBL 13 is also shown in FIG. 3. PIG 12 is characterized by pendulosity $P_2$ ($=m_2 L_2$) angular momentum $H_2$ ($=I_2 \Omega_2$) of the wheel 42 and the gyro float transfer function $$\frac{1}{J_{F2} s^2 + D_{F2} s}$$

and signal generator gain $K_{SG2}$. The torquer 54 is characterized by its winding transfer function $$\frac{1}{L_2 s + R_2}$$

and the motor torque constant $K_{T2}$. It will be understood that the parameters $J_{F2}$, $D_{F2}$, $L_2$ and $R_2$ as shown for PIG 12 represent substantially similar characteristics as the correspondingly defined parameters in PIG 10.

The summing network shown for PIG 12 depicts the combination of inputs thereto, i.e. the gravitational acceleration affecting that PIG, $a_2$ (as modified by pendulosity of PIG 12), the precessional velocity $\omega_s$ applied via shaft 14 to the PIG 12 (as modified by the angular momentum $H_2$), and the signal generated by servo electronics 56 (as modified by torquer 54).

Summing the torques at the summation network of PIG 10, and solving for the precessional velocity $\omega_s$, yields:

$$\omega_s = \frac{a_1 P_1 + E_1}{H_1} \tag{1}$$

where $E_1$ is the error torque associated with PIG 10. For TBL 13, the torque M applied by torquer 54 may be expressed by summing the torques at the summation network of PIG 12, as follows:

$$M = a_2 P_2 + E_2 - \omega_s H_2 \tag{2}$$

where $E_2$ is the error torque associated with TBL 13. By combining equations (1) and (2), torque M may be alternatively expressed:

$$M = E_2 - \frac{H_2}{H_1} E_1 + H_2 \left[ \frac{P_2}{H_2} a_2 - \frac{P_1}{H_1} a_1 \right] \tag{3}$$

The ratio $P_2/H_2$ may be constrained to equal $P_1/H_1$ (and equal to $P/H$) by adjusting the rotational speed of wheel 42 relative to that of wheel 22 in the preferred embodiment. Although PIG's 10 and 12 are identical, in general, there are slight mismatches of the m, L and I characteristics of those PIG's. These mismatches may be accommodated by adjusting the relative wheel speeds. In alternative embodiments, these ratios may be constrained to be equal by adjusting the distance $L_2$ of unbalance mass 48 while maintaining the distance $L_1$ of unbalance mass 28 constant, for example.

With $P_1/H_1 = P_2/H_2$ ($= P/H$), equation (3) reduces to the following form:

$$M = E_2 - \frac{H_2}{H_1} E_1 + H_2 \frac{P}{H}(a_2 - a_1) \tag{4}$$

In the absence of constant PIG torque biases (which if present may be offset by torquer 34), the error terms $E_1$ and $E_2$ in this latter expression are maintained very small by the two servo loops (PIGA 11 and TBL 13). Therefore, the torque M is proportional to the difference in acceleration $a_2 - a_1$, as sensed by PIG's 10 and 12. Accordingly, the output signal from servo electronics 56 is proportional to that difference in acceleration.

FIG. 3 also shows a gravity gradient read-out 60 and a vertical sensor unit 58. Sensor unit 58 controls read-out 60 to transfer the signal from electronics 56 to the output line 60a with an appropriate scale factor so that the signal on line 60a is proportional to the vertical gravity gradient $$\frac{g_2 - g_1}{L}$$

(where $g_1$ and $g_2$ are the vertical gravitational accelerations applied to PIG's 10 and 12, respectively).

Figure 4:
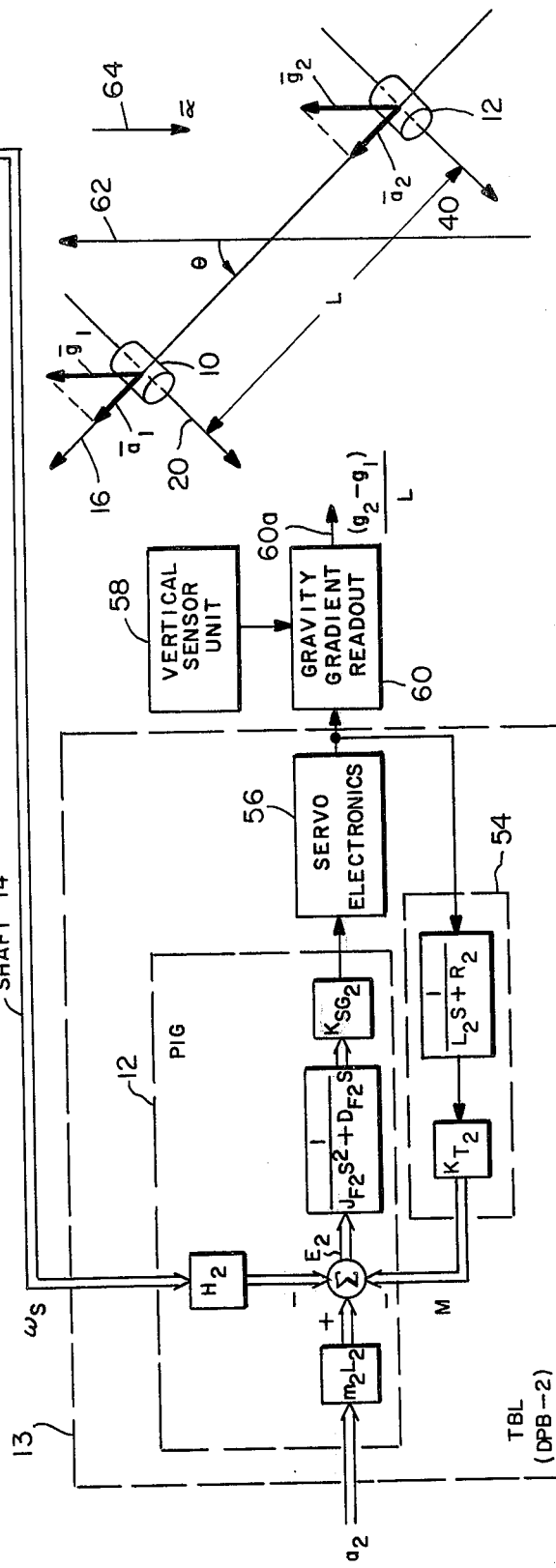
FIG. 4 shows, in simplified form, a gradiometer, according to the present invention, having its sensitive axis offset from the local vertical.

FIG. 4 shows a simplified gradiometer in accordance with the present invention having its sensitive axis 16 offset from the vertical axis 62 by an angle $\theta$. It will be understood that in FIG. 4, only PIG's 10 and 12 and coupling shaft 14 are shown for simplicity. For this simplified model, a one dimensional gravity gradient is assumed having a magnitude $\alpha$ in the vertical direction as indicated by the reference arrow 64. In practice, the gradiometer response similarly includes all components of the actual three dimensional gravity gradient which lie along the sensitive axis.

In FIG. 4, the vectors $g_1$ and $g_2$ represent the vertical gravitational acceleration vector components applied to PIG's 10 and 12, respectively, while the vectors $a_1$ and $a_2$ represent the vector components of $g_1$ and $g_2$ along the sensitive axis 16. From the geometry shown in FIG. 4, $g_1$, $g_2$ and $a_1$, $a_2$ may be expressed as:

$$g_1 = a_0 + \frac{\alpha L}{2} \cos \theta \tag{5}$$

$$g_2 = a_0 - \frac{\alpha L}{2} \cos \theta \tag{6}$$

$$a_1 = g_1 \cos \theta \tag{7}$$
$$a_2 = g_2 \cos \theta \tag{8}$$

where $a_0$ is the gravitational acceleration defined to be "up" at the center of gravity of the gradiometer. By substituting these expressions into equation (4), the torque-to-balance M becomes:

$$M = E_2 - \frac{H_2}{H_1} E_1 - H_2 \frac{P}{H} L \alpha \cos^2 \theta \tag{9}$$

Since the $E_1$ and $E_2$ terms are nulled by PIGA 11 and TBL 13, (or by the bias adjustment via torquer 34), the torque-to-balance M is approximately:

$$M \approx K \alpha \cos^2 \theta \tag{10}$$

where $K = -H_2 P/H L$, all known quantities.

Accordingly, when the sensitive axis 16 is offset from the vertical as detected by the vertical sensor unit 58, the gravity gradient read-out means 60 is effective to scale the output signal of servo electronics 56 by the square of the cosine of the offset angle of axis 16 from axis 62. As a result, the output signal on line 60a is directly proportional to the magnitude of the vertical gravity gradient.

A practical embodiment of the gradiometer of FIGS. 1–3 for a borehole environment is shown in FIGS. 5–7. In FIGS. 5–7, elements corresponding to similar elements in FIGS. 1–3 are denoted with identical reference numerals.

The gradiometer in FIG. 5 is three meters in length with an 88 mm outer diameter of casing 15. Within casing 15 is shown a power supply 70, vertical sensor unit 58, wheel speed control 72, the PIGA 11, servo electronics 35 and PIGA 11 and TBL 13 as coupled by shaft 14. The servo electronics 56 for TBL 13 and temperature control means 74 and 76 are mounted within shaft 14. PIGA 11 and TBL 13 are shown in more detailed form in FIGS. 6 and 7, respectively.

In FIG. 6, PIG 10 is shown mounted at the upper end of shaft 14 and coupled by a slip ring capsule 78 and duplex bearing assembly 80 to the rotor of torque motor 36. Also shown is a resolver 82 for generating a signal representative of the angular displacement of shaft 14 about axis 16. This entire assembly is coupled to the casing 15 via a shock mounting 84.

FIG. 7 shows the PIG 12 mounted at the lower end of shaft 14 and coupled via duplex bearings 86 in a manner permitting free rotation about axis 16. It will be understood that the various portions of the balancing assembly for shaft 14 including the fin-like portions shown in FIGS. 6 and 7 are configured, as indicated, of the steel, titanium, aluminum or copper. In operation, the temperature control devices 74 and 76 provide a controlled temperature environment for the gradiometer, which is compensatory for the outer temperature changes experienced in a borehole environment.

The PIG's 10 and 12 in the embodiment shown in FIGS. 1–7 are single degree of freedom pendulous integrating gyros characterized by the physical parameters set forth in Table I. The PIGA 11 configuration is characterized by the parameters set forth in Table II.

Figure 8:
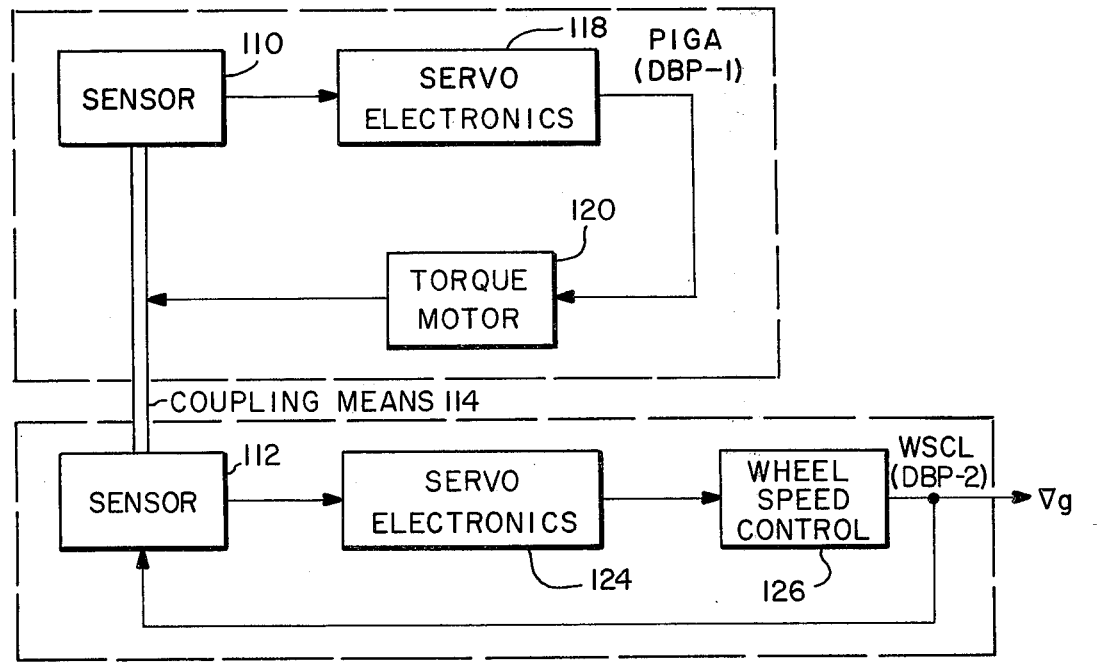
FIGS. 8–10 show, in block diagram form, alternative embodiments of the present invention.
Figure 9:
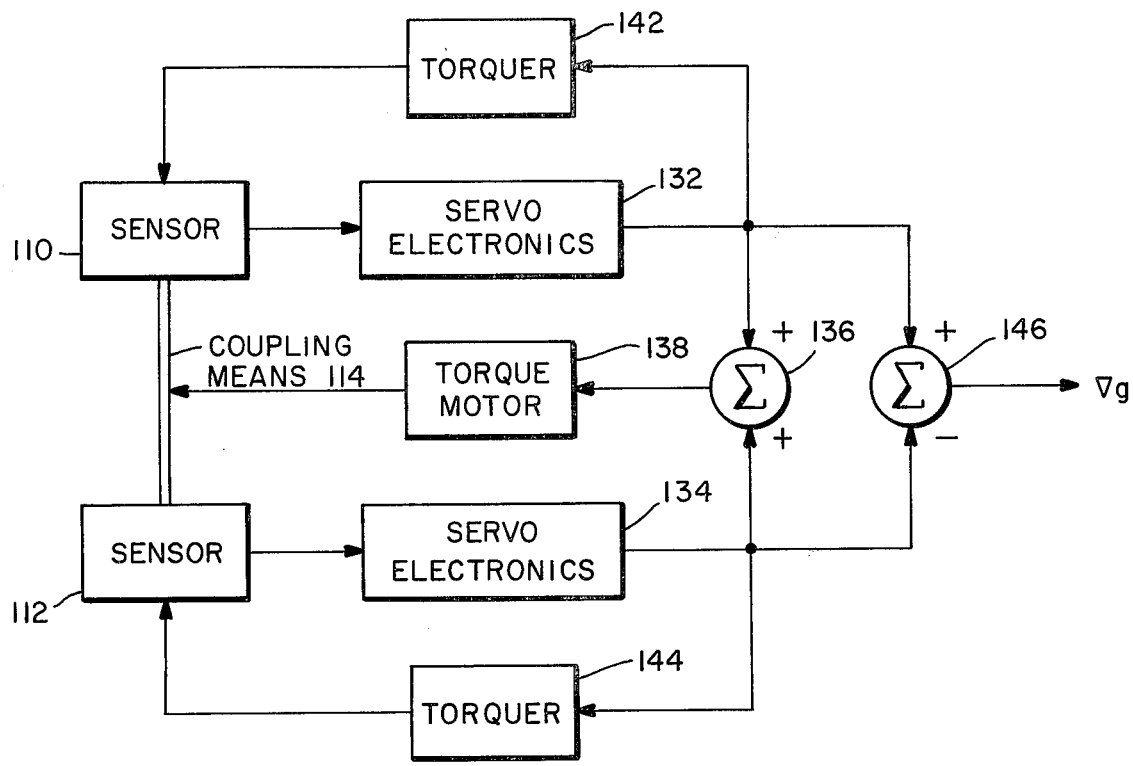
Figure 10:
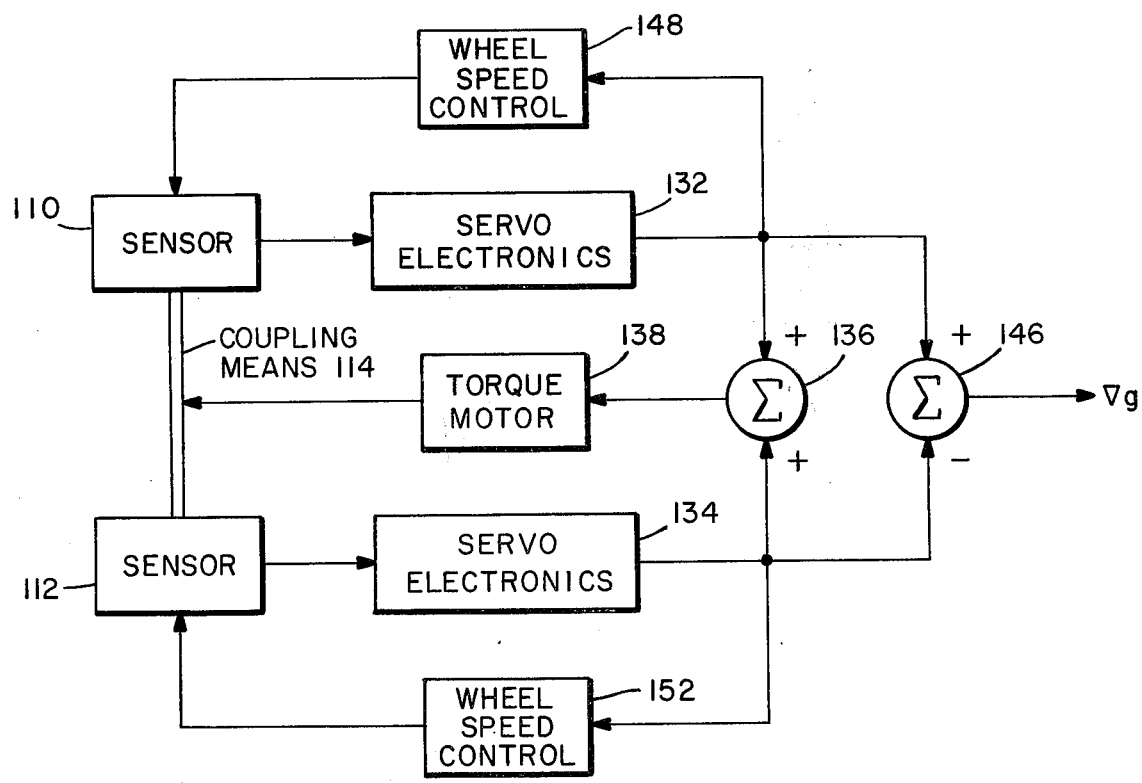

FIGS. 8–10 show alternative embodiments of the present invention. In each of these embodiments, two substantially identical PIG sensors 110 and 112 are rotationally coupled by a coupling means 114 in a similar manner to the embodiment shown in FIGS. 1–7; for example, by mechanical coupling using a shaft, or by electrical coupling using a synchro-repeater system.

In FIG. 8, the upper DBP (DBP-1) is arranged in a PIGA configuration, having PIG 110, servo electronics 118 (including a signal generator) driving a torque motor 120 which in turn rotates the coupled PIG's about their sensitive axes. As in the embodiment described in conjunction with FIGS. 1–7, the spin axis of the upper PIG is nulled by the accelerometer servo loop with the result that the precessional motion of the coupled PIG's is proportional to the gravitational acceleration sensed at that PIG.

TABLE I

| | |
|---|---|
| Pendulosity (mL) | 2000 dyne-cm/g |
| Signal generator gain ($K_{SG}$) | 32 volts/rad |
| Moment of inertial of float ($J_F$) (about the output axis) | 22 gm-cm² |
| Damping coefficient of float ($D_F$) (about the input axis) | 46,000 dyne-cm/rad/sec |
| Angular momentum of wheel (H) | 2000 dyne-cm/rad/sec |
| Torquer winding resistance (R) | 110 ohms |
| Torquer winding inductance (L) | 25 millihenries |
| Torquer constant ($K_T$) | $5 \times 10^5$ dyne-cm/amp |

TABLE II

| | |
|---|---|
| Damping coefficient of gyro ($D_G$) (about the input axis) | 3000 dyne-cm/rad/sec |
| Moment of inertia of gyro ($J_G$) (about the input axis) | 1100 gm-cm² |
| Motor winding resistance ($R_M$) | 35 ohms |
| Motor winding inductance ($L_M$) | 10 millihenries |
| Motor constant ($K_M$) | $1.55 \times 10^6$ dyne-cm/amp |

The lower DBP (DBP-2) is configured in a Wheel Speed Control Loop (WSCL) having PIG 112, servo electronics 124 (including a signal generator) and a wheel speed control 126 for driving the wheel of PIG 112. This wheel speed loop is configured to adjust the speed of the wheel in PIG 112 in such a manner to null the angular displacement of the spin axis of the wheel of the lower PIG. Thus, since the wheel speed of the upper PIG is fixed and consequently, the angular momentum of that PIG is fixed, a signal representative of the rotational velocity of the PIG 112 wheel required to null the spin axis displacement of PIG 112, is proportional to the gravity gradient, $\nabla g$, sensed along the gradiometer sensitive axis.

FIGS. 9 and 10 show still other embodiments of the present invention wherein the two DBP's, including PIG's 110 and 112 and associated servo electronics 132 and 134, interact via summing networks 136 and torque motors 138, to form an average acceleration loop whereby the two PIG's rotate about their sensitive axes at an angular rate proportional to the average of the gravitational accelerations applied at the respective PIG's.

In the embodiment of FIG. 9, the two PIG's are nulled by torquers 142 and 144, effectively acting to establish interacting TBL's. The difference network 146 provides an output signal proportional to the difference of the torques-to-balance the pendulous elements of PIG's 110 and 112. This signal is proportional to the gravity gradient, $\nabla g$, along the gradiometer sensitive axis.

In the embodiment of FIG. 10, the two PIG's are nulled by wheel speed controls 148 and 152, effectively acting to establish interacting WSPC's. The difference network 154 provides an output signal proportional to the difference in wheel speeds-to-balance the pendulous elements of PIG's 110 and 112. This signal is proportional to the gravity gradient, $\nabla g$, along the gradiometer sensitive axis.

The embodiments shown in conjunction with FIGS. 1–10 all have been described above as comprising PIG's as the sensor elements of the DBP's. However, it will be understood that in other embodiments of the present invention, the sensors of the dynamically balanced pendulums may comprise alternative sensors in lieu of PIG's; for example, the embodiments of FIGS. 1–7 and 9 may comprise a pair of rotationally coupled DBP's, wherein each DBP may be centrifugally balanced and have the form disclosed in U.S. Pat. No. 3,190,121.

It will be understood that while the presently described embodiments are particularly suitable for use in a borehole environment, other variations of the present invention may be utilized in other environments. For example, a pair of rotationally coupled DBP's may be used as a gravity gradiometer in airborne applications or, as a further example, in space flight measurements.

The invention may be embodied in other specific forms without departing from the spirit or essential characteristics thereof. The present embodiments are therefore to be considered in all respects as illustrative and not restrictive, the scope of the invention being indicated by the appended claims rather than meaning and range of equivalency of the claims are therefore intended to be embraced therein.

I claim:
1. A gravity gradiometer comprising:
   A. first and second dynamically balanced pendulum (DBP), each including a sensor having perpendicular DBP input and output axes and a DBP sensitive axis, said DBP sensitive axis being perpendicular to said output axis and having a common intersection point with said input and output axes, wherein the sensitive axis of each sensor is parallel to a common gradiometer sensitive axis, and
   B. a means for coupling said first and second sensors to rotate at related angular rates about their respective sensitive axes, said angular rates being related to physical characteristics of said sensors, said sensors being separated by a predetermined distance along said gradiometer sensitive axis.

2. A gravity gradiometer according to claim 1 wherein said coupling means mechanically couples said sensors.

3. A gravity gradiometer according to claim 2 wherein said coupling means comprises a shaft rigidly connecting said sensors, said shaft being coaxial with said gradiometer sensitive axis.

4. A gravity gradiometer according to claim 1 wherein said coupling means electrically couples said sensors.

5. A gravity gradiometer according to claim 4 wherein said coupling means comprises a synchro resolver having an angle encoder associated with one of said sensors for generating an angle signal representative of the angular displacement of that sensor about its sensitive axis, and a driving means associated with the other of said sensors, said driving means being responsive to said angle signal for angularly displacing said other sensor about its sensitive axis by an angle related to said signal.

6. A gravity gradiometer according to claim 1 wherein said first DBP (DBP-1) comprises an accelerometer servo loop, said loop being configured to null gravity-induced displacements of the DBP-1 input axis from the DBP-1 sensitive axis and to rotate said first sensor about said DBP-1 sensitive axis at an angular rate proportional to the gravitational force applied thereto.

7. A gravity gradiometer according to claim 6 wherein said second DBP (DBP-2) comprises a torque-to-balance loop (TBL), said TBL being configured to null displacements of the DBP-2 input axis from the DBP-2 sensitive axis, said displacements being due to both the gravitational force applied to said second sensor and any torque applied to said second sensor about its sensitive axis via said coupling means.

8. A gravity gradiometer according to claim 7 wherein the ratio of said angular rates of said first and second sensors is proportional to the square root of the ratio of the pendulosities of said first and second sensors.

9. A gravity gradiometer according to claim 6 wherein said accelerometer servo loop comprises a pendulous integrating gyro accelerometer (PIGA) including said first sensor, said first sensor being:
a pendulous integrating gyro (PIG-1) having its sensitive axis aligned with and being free to rotate about said DBP-1 sensitive axis,
and said PIGA further including:
A. servo electronics including a signal generator for generating a control signal representative of the angular displacement of said PIG-1 about said DBP-1 output axis, and
B. a torque motor responsive to said control signal to apply a torque to said PIG-1 about said DBP-1 sensitive axis.

10. A gravity gradiometer according to claim 9 wherein said PIG-1 comprises:
A. a gyro float, said float being free to rotate about said DBP-1 output axis, said float being characterized by a primary mass having its center of gravity located at the point of intersection of said DBP-1 input and output axes and an unbalance mass having its center of gravity located at a predetermined distance from said intersection point along a PIG-1 spin axis, said PIG-1 spin axis passing through said intersection point and being perpendicular to both said DBP-1 input and output axis, and
B. a gyro wheel and wheel driving means, said wheel being driven by said driving means to rotate at a predetermined angular rate about said PIG-1 spin axis, said wheel being coupled to said float so that the angular displacements of said input axis and said float about said output axis are identical.

11. A gravity gradiometer according to claim 10 wherein said second DBP (DBP-2) comprises a torque-to-balance loop (TBL), said TBL being configured to null displacements of the DBP-2 input axis from the DBP-2 sensitive axis, said displacements being due to both the gravitational force applied to said second sensor and any torque applied to said second sensor about its sensitive axis via said coupling means.

12. A gravity gradiometer according to claim 11 wherein said TBL includes said second sensor, said second sensor being:
a pendulous integrating gyro (PIG-2), said PIG-2 having its sensitive axis aligned with said DBP-2 sensitive axis,
and said TBL further includes:
A. servo electronics including a signal generator for generating a control signal representative of the angular displacement of said PIG-2 about said DBP-2 output axis, and
B. a PIG torquer responsive to said control signal to apply a torque to said PIG-2 about said DBP-2 output axis.

13. A gravity gradiometer according to claim 12 wherein said PIG-2 comprises:
A. a gyro float, said float being free to rotate about said DBP-2 output axis, said float being characterized by a primary mass having its center of gravity located at the point of intersection of said DBP-2 input and output axes and an unbalance mass having its center of gravity located at a predetermined distance from said intersection point along a PIG-2 spin axis, said PIG-2 spin axis passing through said intersection point and being perpendicular to both said DBP-2 input and output axes, and
B. a gyro wheel and wheel driving means, said wheel being driven by said driving means to rotate at a predetermined angular rate about said PIG-2 spin axis, said wheel being coupled to said float so that the angular displacements of said input axis and said float about said output axis are identical.

14. A gravity gradiometer according to claim 13 wherein the ratio of said angular rates of said first and second sensor is proportional to the product of the ratio of the gyro wheel angular momentum to the pendulosity of said first sensor and the ratio of the pendulosity to the gyro wheel angular momentum of said second sensor.

15. A gravity gradiometer according to claim 10 wherein said second DBP (DBP-2) comprises a wheel speed control loop (WSCL), said WSCL being configured to null displacements of the DBP-2 input axis from the DBP-2 sensitive axis, said displacements being due to both gravitational force applied to said second sensor and any torque applied to said second sensor about its sensitive axis via said coupling means.

16. A gravity gradiometer according to claim 15 wherein said WSCL includes said second sensor, said second sensor being:
a pendulous integrating gyro (PIG-2), said PIG-2 having its sensitive axis aligned with said DBP-2 sensitive axis,
and said WSCL further includes:
a signal generator for generating a wheel speed control signal, said wheel speed control signal being representative of the angular displacement of said PIG-2 about said DBP-2 output axis.

17. A gravity gradiometer according to claim 16 wherein said PIG-2 comprises:
A. a gyro float, said float being free to rotate about said DBP-2 output axis, said float being characterized by a primary mass having its center of gravity located at the point of intersection of said DBP-2 input and output axes and an unbalance mass having its center of gravity located at a predetermined distance from said intersection point along a PIG-2 spin axis, said PIG-2 spin axis passing through said intersection point and being perpendicular to both said DBP-2 input and output axes, and
B. a gyro wheel and wheel driving means, said wheel driving means being responsive to said wheel speed control signal to rotate said wheel at an angular rate about said PIG-2 spin axis, said rate being proportional to the angular displacement of said PIG-2 about said DBP-2 output axis, and said wheel being coupled to said float so that the angular displacements of said input axis and said float about said output axis are identical.

18. A gravity gradiometer according to claim 17 wherein the ratio of said angular rates of said first and second sensor is proportional to the product of the ratio of the gyro wheel angular momentum to the pendulosity of said first sensor and the ratio of the pendulosity to the gyro wheel angular momentum of said second sensor.

19. A gravity gradiometer according to claim 1 wherein said first and second DBP's (DBP-1 and DBP-2) comprise an average acceleration loop, said loop being configured to null angular displacements of DBP-1 and DBP-2 input axes from the respective DBP sensitive axes, said displacements being due to both gravitational force applied to said first and second sensors and any torque applied to said first and second sensors about their respective sensitive axes via said coupling means, and said loop being further configured to rotate first and second sensors about their respective DBP sensitive axes at an angular rate, said rate being proportional to the sum of the gravitational forces applied to each sensor.

20. A gravity gradiometer according to claim 19 wherein said average acceleration loop comprises:
A. said first and second sensors,
B. a signal generator associated with each sensor for generating an error control signal representative of the angular displacement of its associated sensor about its DBP output axis,
C. a torquer associated with each sensor responsive to said error control signal to apply a torque to its associated sensor about its DBP output axis,
D. a sum network for generating said sum control signal representative of the sum of the error control signal generated by said signal generators,
E. a torque motor responsive to said sum control signal to apply a torque to said first and second sensors about their respective DBP sensitive axes, and
F. a difference network for generating a difference control signal representative of the difference between the error control signals generated by said signal generators.

21. A gravity gradiometer according to claim 20 wherein each of said first and second sensors comprises a pendulous integrating gyro (PIG), each PIG having its sensitive axis aligned with the associated DBP sensitive axis, and each PIG including:
A. a gyro float, said float being free to rotate about its associated DBP output axis, said float being characterized by a primary mass having its center of gravity located at the point of intersection of the associated DBP input and output axes and an unbalance mass having its center of gravity located at a predetermined distance from said intersection point along a PIG spin axis, said PIG spin axis passing through said intersection point and being perpendicular to both associated DBP input and output axes, and
B. a gyro wheel and wheel driving means, said wheel being driven by said driving means to rotate at a predetermined angular rate about said PIG spin axis, said wheel being coupled to said float so that the angular displacements of said input axis and said float about said output axis are identical.

22. A gravity gradiometer according to claim 19 wherein said average acceleration loop comprises:
A. said first and second sensors,
B. a signal generator associated with each sensor for generating an error control signal representative of the angular displacement of its associated sensor about its DBP output axis,
C. a wheel speed control means associated with each sensor responsive to said error control signal to generate a wheel drive signal,
D. a sum network for generating a sum control signal representative of the sum of said error control signals applied from each of said signal generators,
E. a torque motor responsive to said sum control signal to apply a torque to both of said sensors about their respective DBP sensitive axes, and
F. a difference network for generating a difference signal representative of the difference between said error control signals.

23. A gravity gradiometer according to claim 22 wherein each of said first and second sensors comprises a pendulous integrating gyro (PIG), each PIG having its sensitive axis aligned with the associated DBP sensitive axis, and each PIG including:
A. a gyro float, said float being free to rotate about its associated DBP output axis, said float being characterized by a primary mass having its center of gravity located at the point of intersection of the associated DBP input and output axes and an unbalance mass having its center of gravity located at a predetermined distance from said intersection point along a PIG spin axis, said PIG spin axis passing through said intersection point and being perpendicular to both associated DBP input and output axes, and
B. a gyro wheel and wheel driving means, said wheel driving means being responsive to the associated one of said wheel speed drive signals to rotate said wheel at an angular rate about said PIG spin axis, said rate being proportional to the angular displacement of said PIG about its associated DBP output axis, and said wheel being coupled to said float so that the angular displacements of said input axis and said float about said output axis are identical.

* * * * *